Dec. 3, 1935.    H. FERGUSON    2,022,762
POWER TRANSMISSION ASSEMBLY FOR MOTOR DRIVEN VEHICLES
Filed June 21, 1934
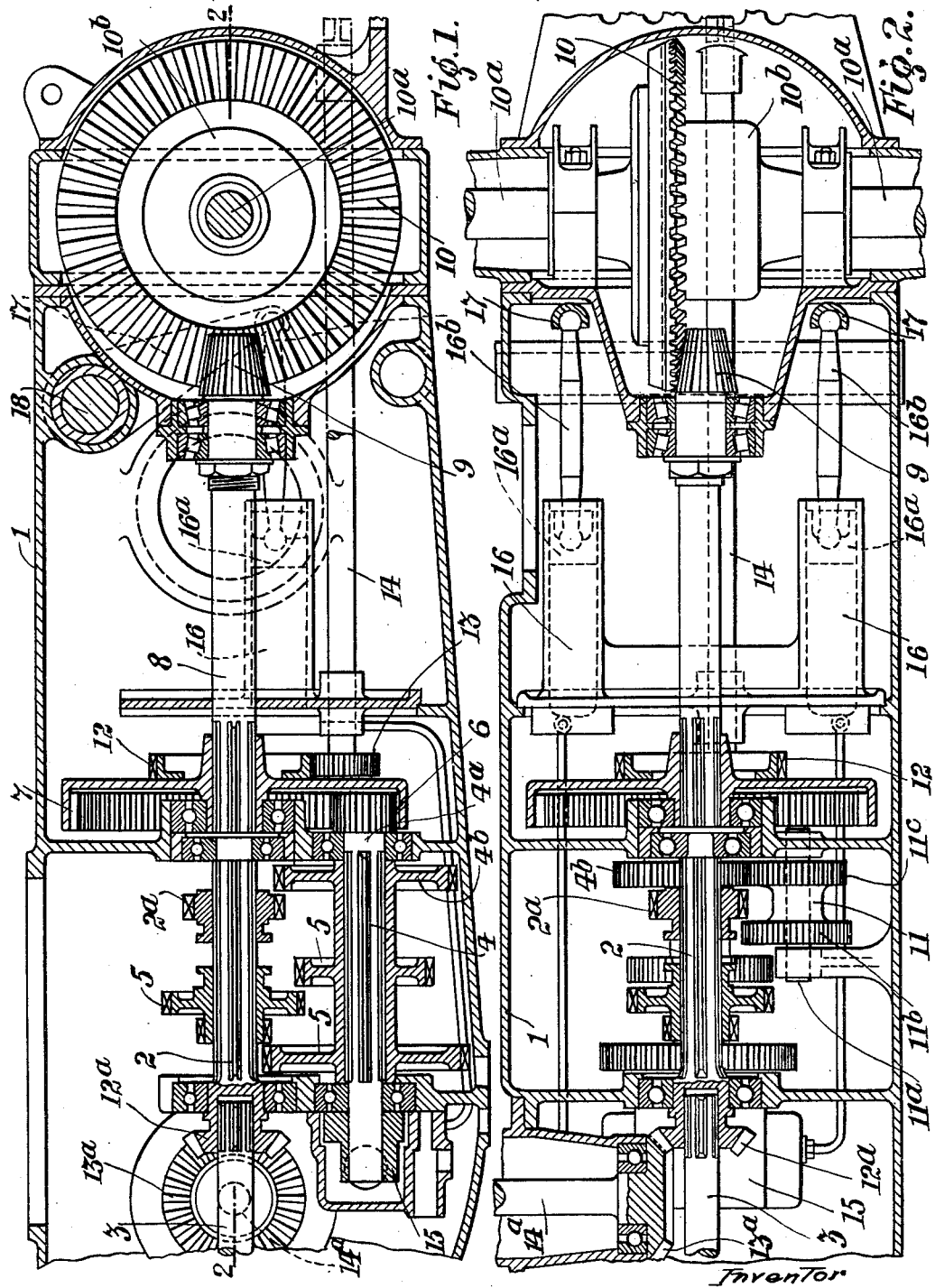
Inventor
H. Ferguson
by [signature] Atty.

Patented Dec. 3, 1935

2,022,762

UNITED STATES PATENT OFFICE 2,022,762

POWER TRANSMISSION ASSEMBLY FOR MOTOR-DRIVEN VEHICLES

Harry Ferguson, Belfast, Ireland

Application June 21, 1934, Serial No. 731,743
In Great Britain July 3, 1933

1 Claim. (Cl. 74—326)

This invention relates to power transmission assemblies for motor-driven vehicles where a big speed-reduction ratio is required in a small space and more particularly to the type of power transmission assemblies for agricultural and road tractors.

An object of the invention is to provide a tractor transmission assembly which, while being light as a whole and therefore not liable to pack the soil, will also be capable of easy manoeuvring and consequently of efficient use under the various conditions met with in practice, including operating on small fields and negotiating awkward corners.

Another object is to provide a compact assembly of gears capable of transmitting power at a high ratio of speed-reduction and preferably arranged adjacent the rear axle of the vehicle in a housing constituting a unitary structure.

Another object is to provide a three-stage speed-reduction power-transmission assembly, one of the speed-reduction stages including variable ratio ahead and reverse gearing.

Another object is to provide an assembly comprising three shafts, namely a motor-driven primary shaft, a secondary shaft extending alongside said primary shaft and connected thereto through variable ratio gears, and a third or vehicle-propelling shaft in continuous connection with the secondary shaft through fixed-ratio gears, one of which is internally toothed and mounted on the third shaft.

Another object is to make provision for suitable power take-offs for external power application.

Another object is to provide a transmission assembly suitable for application to an agricultural tractor where associated implements are operated, and/or controlled, by fluid pressure or other power means.

The transmission is so simple and takes up such limited space that ample room is provided even in a small, light, tractor for power mechanism for controlling or operating the implements, such power mechanism, being, for example, such as is described in my United States patent specification No. 1,687,719. In the case of hydraulic or fluid pressure mechanism for operating or controlling agricultural implements, the drive to the hydraulic or fluid pressure pump may be obtained from the before mentioned secondary shaft. The fluid would be pumped from there to a suitable cylinder or cylinders inside the transmission housing so that the whole transmission gear and power control can be very neatly and compactly housed together in a very light efficient structure.

The invention will now be described, by way of example, with reference to the accompanying drawing, Fig. 1 is a sectional elevation of a transmission housing containing a power transmission assembly in accordance with the invention.

Fig. 2 is a plan view corresponding to Fig. 1, partly in section on the line 2—2 Fig. 1.

Referring to the drawing:—

The example shown is a power transmission assembly and housing therefor, adapted particularly for an agricultural or road tractor and comprising an outer casing or housing 1, within which is arranged the entire assembly, including a primary shaft 2. The primary shaft 2 is driven by an internal combustion engine (not shown) or other prime mover through the medium of the clutch shaft 3. In the example shown the primary shaft 2 is coupled to a secondary shaft 4 through the medium of variable gearing 5 whereby various gear ratios are obtainable between the speed of the shaft 2 and the speed of the shaft 4. If desired, the variable gear may be replaced by a direct unalterable drive between the primary shaft 2 and the secondary shaft 4.

The secondary shaft 4 has at its rearward end 4a a spur wheel 6 of suitable size. This spur wheel 6 is in constant mesh with an internally toothed spur wheel 7, of suitable size to give the desired gear ratio. The spur wheel 7 is mounted on the end of a shaft 8 which, in the example shown, is in alignment with the shaft 2, but need not necessarily be so arranged. Placing the shaft 8 in alignment with the shaft 2 as shown, makes for simplicity in manufacture and also gives compactness to the gear; and it also makes it possible to provide conveniently a clutch (not shown) between the shafts 2 and 8, so that the shafts can be locked together at will to give a direct drive. At the other end of the shaft 8 there is mounted a bevel pinion 9, (preferably a spiral-toothed bevel wheel is used) from which the drive to the load-shaft—that is, the back-axles 10a of the usual ground wheels—is obtained through a large crown wheel 10. Preferably, as is common practice, the drive from the crown wheel 10 to the back-axles is through differential gearing, the casing of which is denoted by 10b.

In the example shown in the drawing, provision is made for reversal of the gear when required by providing a reversing idler 11 mounted on a shaft 11a. To reverse the drive, a gear wheel 2a on the primary shaft 2 is brought into engagement with the wheel 11b of the idler 11 and the drive is then transmitted through the wheel 11c of the idler to a gear wheel 4b on the secondary shaft 4.

Provision is made in the example shown for taking off power for purposes other than propulsion of the vehicle. This may be done by providing an additional spur wheel 12 mounted on the before-mentioned internally toothed wheel 7 and from which spur wheel 12 a variable ratio forward or reverse drive may be taken as required through the spur wheel 13, on the end of the shaft 14 which, in the example shown, is carried to the rear of the tractor. A high-speed fixed ratio power take-off is also provided in the form of a bevel wheel 12a engaging with a bevel wheel 13a on a transverse shaft 14a, from which any desired drive may likewise be taken.

The power transmission assembly hereinbefore described is particularly suitable for application to an agricultural tractor in which the implements are operated and/or controlled by fluid pressure or other power means. In the example shown, control of the implement, or implements, is arranged for hydraulic or fluid pressure operation, and for this purpose provision is made in the housing for an hydraulic or fluid pressure pump 15, mounted on the forward end of the secondary shaft 4 and driven thereby. Oil from the pump 15 is delivered to cylinders 16 for operation of rams 16a therein. The rams 16a are, by the rods 16b connected by levers 17 to the shaft 18 whereby the desired control mechanism to the implement or implements can be operated.

It will be seen that the whole transmission gearing and power control for an implement or implements can be very neatly and compactly housed and protected by providing the power transmission assembly as hereinbefore described. Power control mechanism for implements such as may be operated in conjunction with the power transmission assembly hereinbefore described has, for example, been shown and described in my United States patent specification No. 1,687,719.

I claim:—

A power transmission assembly for vehicles comprising a housing structure, a motor-driven primary shaft, a secondary shaft extending alongside said primary shaft, a pinion shaft coaxial with and rearwards of said primary shaft, all said shafts being journalled in said structure, variable ratio ahead and reverse speed-reduction gearing interconnecting said primary and secondary shafts and adapted to transmit power from the primary to the secondary shaft, a spur wheel fast on the rear of said secondary shaft, an internally toothed spur wheel fast on the front of said pinion shaft and arranged in continuous mesh with said first-mentioned spur wheel, said inter-meshing spur wheels constituting a fixed ratio speed-reduction driving connection to transmit power from said secondary shaft to said pinion shaft, transverse axles at the rear of the assembly, bevel gearing interconnecting said pinion shaft and said axles through the intermediary of a differential gear, said speed-reduction gearing, spur wheels and bevel gearing being all housed in said structure so that the transmission assembly constitutes a complete unit.

HARRY FERGUSON.